United States Patent
Kobayashi et al.

(10) Patent No.: US 6,375,082 B1
(45) Date of Patent: Apr. 23, 2002

(54) PORTABLE ELECTRONIC DEVICE WITH CONTACTING AND NONCONTACTING INTERFACES

(75) Inventors: Tsutomu Kobayashi, Tokyo; Masatsugu Mukuge, Hiratsuka; Hiroo Nakano, Yokohama; Aki Fukuda, Isehara, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/263,955

(22) Filed: Mar. 8, 1999

(30) Foreign Application Priority Data

| Mar. 24, 1998 | (JP) | 10-075574 |
| Mar. 24, 1998 | (JP) | 10-075691 |
| Mar. 24, 1998 | (JP) | 10-075692 |

(51) Int. Cl.[7] .............................................. G06K 19/06
(52) U.S. Cl. ......................................... 235/492; 902/26
(58) Field of Search ................................. 235/492, 379, 235/381, 382, 383, 385, 439, 441, 451; 902/25, 26; 710/102

(56) References Cited

U.S. PATENT DOCUMENTS

| 4,862,501 A | * | 8/1989 | Kamitake et al. | 235/380 X |
| 5,206,495 A | * | 4/1993 | Kreft | 235/492 |
| 5,241,160 A | * | 8/1993 | Bashan et al. | 235/380 |
| 5,612,532 A | * | 3/1997 | Iwasaki | 235/492 |
| 5,710,421 A | * | 1/1998 | Kokubu | 235/492 |
| 5,753,902 A | * | 5/1998 | Fujioka | 235/492 |
| 5,773,812 A | * | 6/1998 | Kreft | 235/492 |
| 5,847,372 A | * | 12/1998 | Kreft | 235/492 |
| 5,929,414 A | * | 7/1999 | Saitoh | 235/380 |
| 5,999,713 A | * | 12/1999 | Reiner et al. | 235/492 X |
| 6,003,777 A | * | 12/1999 | Kowalski | 235/492 |
| 6,045,043 A | * | 4/2000 | Bashan et al. | 235/441 |
| 6,098,890 A | * | 8/2000 | Kreft et al. | 235/492 |
| 6,138,918 A | * | 10/2000 | Tarbouriech | 235/492 |
| 6,145,749 A | * | 11/2000 | Thuringer et al. | 235/492 |
| 6,161,762 A | * | 12/2000 | Bashan et al. | 235/492 |
| 6,168,083 B1 | * | 1/2001 | Berger et al. | 235/492 |
| 6,206,293 B1 | * | 3/2001 | Gutman et al. | 235/441 X |

FOREIGN PATENT DOCUMENTS

| DE | 195 31 372 | 2/1997 |
| EP | 0 424 726 | 5/1991 |
| JP | 10-320510 | * 12/1998 |
| WO | WO 96/38814 | 12/1996 |

* cited by examiner

*Primary Examiner*—Michael G. Lee
*Assistant Examiner*—Jared J. Fureman
(74) *Attorney, Agent, or Firm*—Pillsbury Winthrop

(57) ABSTRACT

A portable electronic device has contacting and noncontacting interfaces and an inhibiting section. The contacting interface including a plurality of contact terminals for exchanging driving power and data. The noncontacting interface for generating driving power and demodulating received data from a signal received via an antenna. The inhibiting section for inhibiting an operation of the other one of the contacting and noncontacting interfaces while the portable electronic device is driven via one of the contacting and noncontacting interfaces.

4 Claims, 11 Drawing Sheets

(COMMAND LIST FOR CONTACTING RESPONSE)

| COMMAND TYPE | ROM ADDRESS |
|---|---|
| AAA (ADDITIONAL WRITE) | aaa |
| BBB (READ) | bbb |
| CCC (REWRITE) | ccc |
| DDD (ERASE) | ddd |
| EEE (ISSUE) | eee |
|  |  |
|  |  |
|  |  |

FIG. 9

(COMMAND LIST FOR NONCONTACTING RESPONSE)

| COMMAND TYPE | ROM ADDRESS |
|---|---|
| AAA (ADDITIONAL WRITE) | aaa |
| BBB (READ) | bbb |

FIG. 10

(COMMON COMMAND LIST)

| COMMAND TYPE | FEASIBILITY IN CONTACTING RESPONSE | FEASIBILITY IN NONCONTACTING RESPONSE | ROM ADDRESS |
|---|---|---|---|
| AAA (ADDITIONAL WRITE) | 1 (OK) | 1 (OK) | aaa |
| BBB (READ) | 1 (OK) | 1 (OK) | bbb |
| CCC (REWRITE) | 1 (OK) | 0 (NO) | ccc |
| DDD (ERASE) | 1 (OK) | 0 (NO) | ddd |
| EEE (ISSUE) | 1 (OK) | 0 (NO) | eee |
| FFF | 1 (OK) | 1 (OK) | fff |
| GGG | 1 (OK) | 1 (OK) | ggg |
| HHH | 1 (OK) | 0 (NO) | hhh |
| III | 1 (OK) | 0 (NO) | iii |
| JJJ | 1 (OK) | 0 (NO) | jjj |

FIG. 11

PORTABLE ELECTRONIC DEVICE WITH CONTACTING AND NONCONTACTING INTERFACES

BACKGROUND OF THE INVENTION

The present invention relates to a portable electronic device such as a composite IC card having contacting and noncontacting interfaces and, more particularly, to a portable electronic device including a composite IC card having contacting and noncontacting interfaces and capable of well maintaining the reliability as a composite IC card by preventing operation errors when driven from either interface, and an IC module for the composite IC card.

One conventional composite IC card having contacting and noncontacting interfaces as a kind of portable electronic device is disclosed in Jpn. Pat. Appln. KOKOKU Publication No. 4-16831.

This composite IC card disclosed in Jpn. Pat. Appln. KOKOKU Publication No. 4-16831 includes a memory, a CPU, and an IC for generating a signal in response to an external input. The card also includes an electrical contact mechanism for responding to an external apparat us by contacting the apparatus and an antenna mechanism for responding to an external apparatus by noncontacting communication.

Data can be written in the memory of this composite IC card and the contents of the memory can be changed from an external apparatus connected to the electrical contact mechanism. To respond to an external apparatus by noncontacting communication, specific information in the memory is modulated and output from the antenna mechanism.

Jpn. Pat. Appln. KOKAI Publication No. 9-326021 has disclosed a composite IC card incorporating a battery which is charged by a voltage supplied from a terminal apparatus.

Unfortunately, the composite IC cards as described above have the following problems.

That is, either of the above composite IC cards has no countermeasure against operation errors occurring when the card is driven via the noncontacting antenna while the card is connected to and driven by an external apparatus via the electrical contact mechanism, or when the card is driven by an external apparatus via the electrical contact mechanism while the card is driven by an external apparatus via the noncontacting antenna. Consequently, the reliability as a composite IC card is unsatisfactory.

Additionally, either composite IC card uses a common IC such as a memory to respond to an external apparatus by contacting the apparatus and respond to an external apparatus by noncontacting communication. However, when the card responds to an external apparatus by noncontacting communication, only data is simply output to the apparatus, so the card is used only as a collating medium in this case. This limits the applications of the card.

Furthermore, when this composite IC card responds to an external apparatus by noncontacting communication, the internal CPU does not operate. Accordingly, no satisfactory security function can be achieved in this noncontacting response.

BRIEF SUMMARY OF THE INVENTION

The present invention has been made in consideration of the above situation, and has as its object to provide a portable electronic device including a composite IC card having contacting and noncontacting interfaces and capable of well maintaining the reliability as a composite IC card by preventing operation errors when drive n from either interface, and an IC module for the composite IC card.

It is another object of the present invention to provide a portable electronic device including a composite IC card having contacting and noncontacting interfaces, capable of being used for various purposes by executing equivalent functions when driven in both contacting and noncontacting manners and achieving a satisfactory security function, and also capable of well maintaining the reliability as a composite IC card by preventing operation errors when driven from either interface.

To achieve the above objects, according to an aspect of the present invention, there is provided a portable electronic device comprising:

a contacting interface including a plurality of contact terminals for exchanging driving power and data;

a noncontacting interface for generating driving power and demodulating received data from a signal received via an antenna; and inhibiting means for inhibiting an operation of the other one of the contacting and noncontacting interfaces while the portable electronic device is driven via one of the contacting and noncontacting interfaces.

To achieve the above objects, according to another aspect of the present invention, there is provided a portable electronic device which has contacting and noncontacting interfaces and a control circuit connected to the contacting and noncontacting interfaces, and is driven by the contacting or noncontacting interface, comprising:

detecting means for detecting whether the portable electronic device is driven via the contacting or noncontacting interface; and connecting means for selectively connecting one of the contacting and noncontacting interfaces to the control circuit and inhibiting a signal input and output via the other one of the contacting or noncontacting interface on the basis of the detection result from the detecting means.

To achieve the above objects, according to still another aspect of the present invention, there is provided a portable electronic device which has contacting and noncontacting interfaces and a control circuit connected to the contacting and noncontacting interfaces, and is driven by the contacting or noncontacting interface, comprising:

detecting means for detecting whether the portable electronic device is driven via the contacting or noncontacting interface; and switching means for switching commands executable by the portable electronic device on the basis of the detection result from the detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a view showing a command list set for a contacting response in a radio combination card 300 according to the fifth embodiment of the present invention;

FIG. 10 is a view showing a command list set for a noncontacting response in the radio combination card 300 according to the fifth embodiment of the present invention;

FIG. 11 is a view showing a command list set for both contacting and noncontacting responses in the radio communication card 300 according to the fifth embodiment of the present invention.

DETAILED DESCRIPTION OF THE INVENTION

Figure 1:
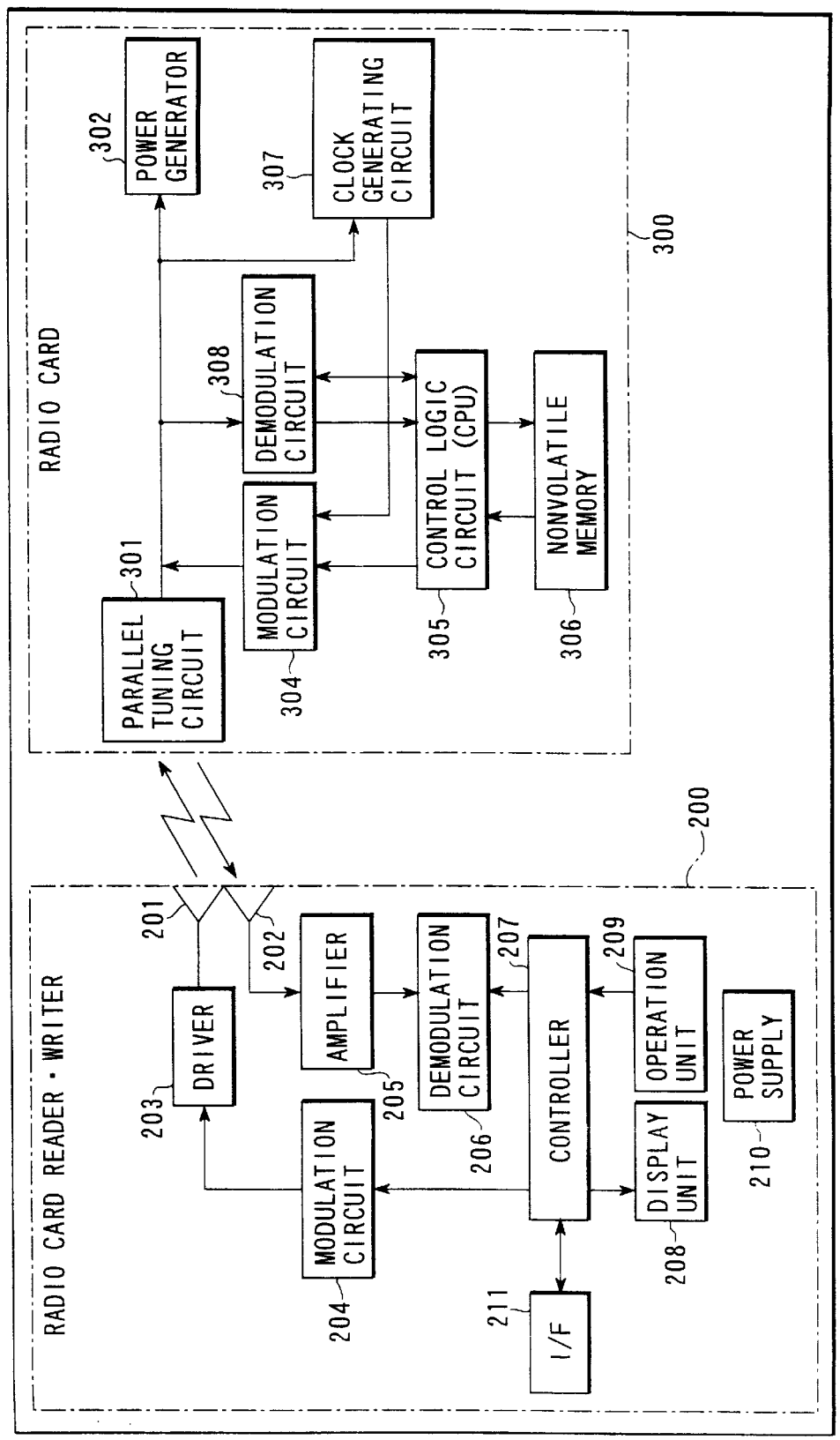
FIG. 1 is a block diagram showing the arrangement of a radio card system using a radio combination card as a data storage medium applied as a composite IC card as a kind of portable electronic device according to the present invention.

Reference will now be made in detail to the presently preferred embodiments of the invention as illustrated in the accompanying drawings, in which like reference characters designate like or corresponding parts throughout the several drawings.

Embodiments of the present invention will be described in detail below with reference to the accompanying drawing.

First Embodiment

The first embodiment of the present invention will be described below with reference to FIGS. 1 to 3.

FIG. 1 shows the arrangement of a radio card system using a radio combination card as a data storage medium applied as a composite IC card as a kind of portable electronic device according to the present invention.

As shown in FIG. 1, this radio card system is roughly divided into a radio card reader-writer 200 as a data processor and a radio combination card 300 as a portable data storage medium having both a contacting communication function and a radio communication function.

The radio card reader-writer 200 transmits read and write (store) commands to the radio combination card 300, processes readout data from the card 300, and transmits write data to the card 300. As shown in FIG. 1, the radio card reader-writer 200 includes a controller 207, a modulation circuit 204, a driver 203 for transmission, a transmitting antenna 201, a receiving antenna 202, an amplifier 205 for reception, a demodulation circuit 206, an operation unit 209 such as a keyboard, a display unit 208, a power supply 210 mainly composed of a battery for supplying an operating voltage to each unit, and an interface 211 connected to an external apparatus (not shown).

The radio combination card 300 decodes commands and writes (stores) data from and transmits data to the radio card reader writer 200. As shown in FIG. 1, a parallel tuning circuit (receiving means) 301 including a loop antenna coil (not shown) as a transmitting/receiving antenna and a tuning capacitor (not shown), a power generator (power generating means) 302, a demodulation circuit (demodulating means) 303, a control logic circuit (CPU) 305, a modulation circuit (modulating means) 304, a nonvolatile memory 306 as a storage means such as an EEPROM, and a clock generating circuit (clock generating means) 307.

Figure 2:
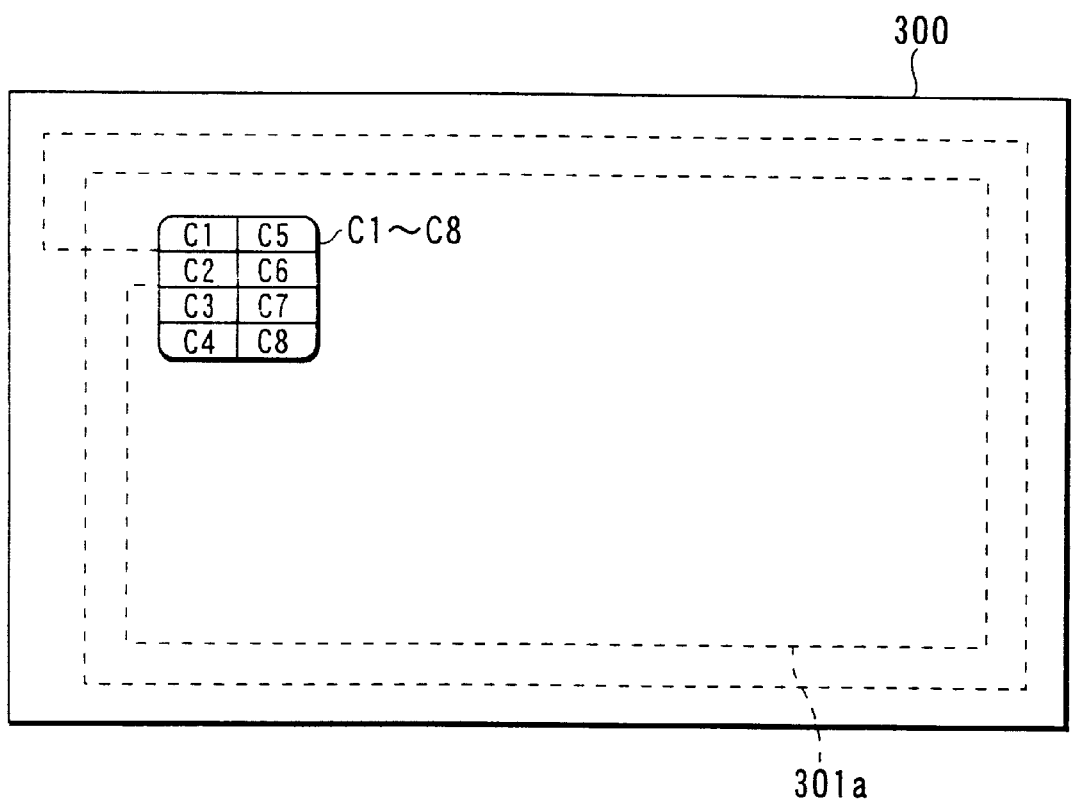
FIG. 2 is a view showing a composite IC card IC module including eight electrical contacts C1 to C8 exposed to the outer surface as an electrical contact mechanism by which the radio combination card responds to an external apparatus by contacting the apparatus, and a one-chip microprocessor 310 embedded in the card.

Assume that this radio combination card 300 is used to execute a contacting communication function (to be described later) and, as shown in FIG. 2, includes eight electrical contacts C1 to C8 exposed to the outer surface as an electrical contact mechanism for responding to an external apparatus by contacting the apparatus.

The radio card reader-writer 200 and the radio combination card 300 will be described in more detail below.

First, a data read performed for the radio combination card 300 by the radio card reader-writer 200 will be described.

The controller 207 of the radio card reader-writer 200 generates and supplies a read command to the modulation circuit 204.

The modulation circuit 204 modulates the command by an arbitrary modulation scheme and inputs the modulated command to the driver 203 for transmission.

The driver 203 amplifies the modulated signal to an intensity enough to radiate the modulated signal and supplies the amplified signal to the transmitting antenna 201.

The signal supplied to the transmitting antenna 201 is radiated into air and received by the parallel tuning circuit 301 of the radio combination card 300.

The demodulation circuit 303 demodulates the received signal and supplies the demodulated signal to the control logic circuit 305 where command analysis is performed.

The control logic circuit 305 determines that the command indicates a data read, reads out predetermined data from the nonvolatile memory 306 storing card data, and inputs the readout data to the modulation circuit 304.

The modulation circuit 304 modulates the card data and supplies the modulated data to the parallel tuning circuit 301.

The signal supplied to the parallel tuning circuit 301 is radiated into air and received by the receiving antenna 202 of the radio card reader-writer 200.

The received signal is applied to the amplifier 205 for reception.

The amplifier 205 amplifies the received signal and inputs the amplified signal to the demodulation circuit 206 where the signal is demodulated.

The demodulated signal is supplied to the controller 207 where predetermined data processing is performed.

Note that the display unit 208 can display data and the operation unit 209 can input data where necessary.

Next, a data write performed for the radio combination card 300 by the radio card reader·writer 200 will be described.

The controller 207 of the radio card reader·writer 200 generates and supplies a write command and write data to the modulation circuit 204.

The modulation circuit 204 modulates the command and data by an arbitrary modulation scheme and inputs the modulated command and data to the driver 203 for transmission.

The driver 203 amplifies the modulated signal to an intensity enough to radiate the modulated signal and supplies the amplified signal to the transmitting antenna 201.

The signal supplied to the transmitting antenna 201 is radiated into air and received by the parallel tuning circuit 301 of the radio combination card 300.

The demodulation circuit 303 demodulates the received signal and supplies the demodulated signal to the control logic circuit 305 where command analysis is performed.

The control logic circuit 305 determines that the command indicates a data write, and writes the write data transmitted after the write command at a predetermined address of the nonvolatile memory 306.

The power generator 302 of the radio combination card 300 branches and rectifies a signal received by the parallel tuning circuit 301 to generate power to be consumed in the radio combination card 300.

Also, on the basis of a signal received by the parallel tuning circuit 301, the clock generating circuit 307 of the radio combination card 300 generates clocks necessary to operate each circuit.

The clock generating circuit 307 outputs the generated clocks to the demodulation circuit 303, the modulation circuit 304, and the control logic circuit 305.

As described above, the transmitting antenna 201 and the receiving antenna 202 of the radio card reader·writer 200 must be arranged close and opposite to the parallel tuning circuit 301 of the radio combination card 300.

The transmitting antenna 201 radiates a high-intensity signal to the radio combination card 300.

The receiving system has a high sensitivity to receive weak signals from the radio combination card 300.

The internal arrangement of the radio combination card 300 will be described in detail below with reference to FIGS. 2 and 3.

Figure 3:
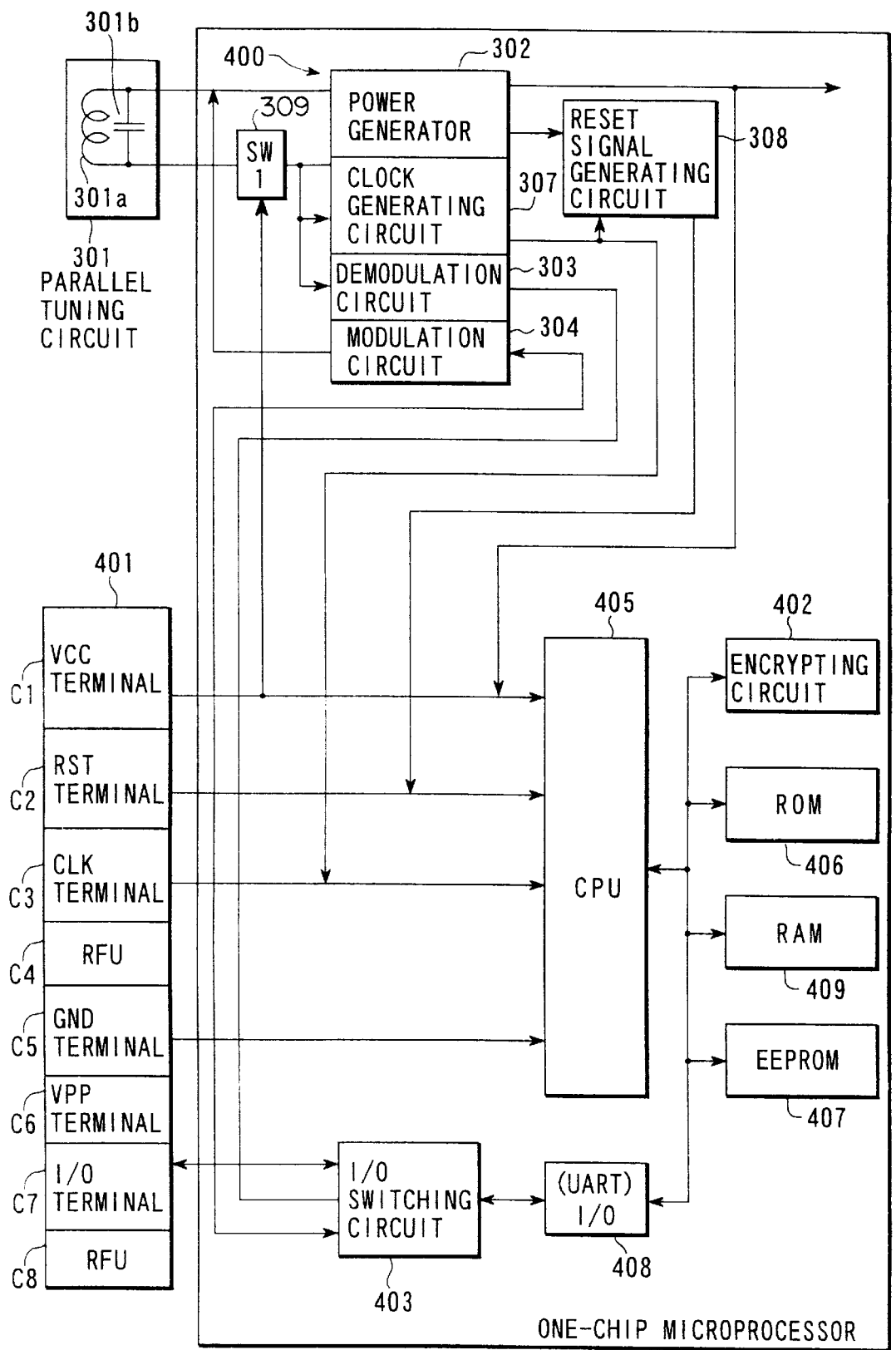
FIG. 3 is a block diagram showing the arrangement of a one-chip microprocessor 310 embedded in a radio combination card 300 according to the first embodiment of the present invention.

As shown in FIGS. 2 and 3, a contacting interface 401 for contacting a terminal apparatus is formed on the card surface of the radio combination card 300. This contacting interface 401 includes contact terminals C1 (VCC), C2 (RST), C3 (CLK), C4 (a space terminal for the future: RFU), C5 (GND), C6 (VPP: unused), C7 (I/O), and C8 (a space terminal for the future: RFU).

A one-chip microprocessor 310 as shown in FIGS. 2 and 3 is embedded in the radio combination card 300.

As shown in FIG. 3, this one-chip microprocessor 310 includes a series of data processors such as a control CPU (Central Processing Unit) 405 corresponding to the control logic circuit 305, a ROM 406 storing control programs, a data memory 407 which is an EEPROM for recording a password (e.g., four digits) and data, an interface circuit 408 such as a UART, a RAM 409 for temporary storage, an encrypting circuit 402, and an I/O switching circuit 403.

When contacting data exchange is performed by using this radio combination card 300, a terminal apparatus into which the card 300 is inserted supplies a voltage from the contact terminal C1 to the VCC (normally 5V) terminal and applies a signal from the contact terminals C3, C2, and C5 to the CLK (clock), RST (reset), and GND (ground potential) terminals, respectively. Simultaneously, the contact terminal C7 is connected to the I/O port to exchange data.

The individual units are formed as an IC chip on a single board.

Also, these units are connected to the terminals through wires, and the terminals and the board mounting the IC chip are integrated and handled as an IC module. Accordingly, as shown in FIG. 2, these terminals are so embedded in the card as to be exposed to the card surface.

The card 300 also includes the parallel tuning circuit 301 for noncontacting data exchange.

That is, the parallel tuning circuit 301 receives a two-phase phase-modulated wave signal (first two-phase phase-modulated wave signal) from the transmitting antenna 201 of the radio card reader writer 200 and transmits a two-phase phase-modulated wave signal (second two-phase phase-modulated wave signal) with a carrier frequency f0/2. This parallel tuning circuit 301 is composed of a loop antenna coil 301a and a tuning capacitor 301b.

The loop antenna coil 301a of this parallel tuning circuit 301 receives signals and at the same time transmits the carrier frequency f0/2. Since power for generating a power supply voltage must be efficiently extracted from a received radio wave, the loop antenna coil 301a is tuned to a carrier frequency f0 of the received two-phase phase-modulated wave signal.

This carrier frequency for transmission can also be a fraction of an integer multiple, instead of ½, of the carrier frequency of the received two-phase phase-modulated wave signal.

The loop antenna coil 301a simply transmits and receives signals, so a single coil can be used for both transmission and reception. However, separate coils can also be used for transmission and reception.

To perform noncontacting data exchange, the one-chip microprocessor 310 incorporates a noncontacting interface circuit 400 for exchanging data via the parallel tuning circuit 301.

This noncontacting interface circuit 400 includes the power generator 302, the clock generating circuit (clock generating means) 307, the demodulation circuit (demodulating means) 303, the modulation circuit (modulating means) 304, and a reset signal generating circuit 308. The power generator 302 generates power to be supplied to the whole internal circuit of the radio combination card 300 by using the two-phase phase-modulated wave signal from the parallel tuning circuit 301. The clock generating circuit 307 generates operating clocks from an analog signal received via the parallel tuning circuit 301. The demodulation circuit 303 converts the analog signal received via the parallel tuning circuit 301 into a digital signal to be read out by the CPU 405 of the one-chip microprocessor 310. The modulation circuit 304 modulates an oscillation circuit output by using a signal from the CPU 405 and transmits the modulated output from the loop antenna (transmitting) coil 301a of the parallel tuning circuit 301. The reset signal generating circuit 308 generates a reset signal on the basis of the clocks generated by the clock generating circuit 307.

The radio combination card 300 incorporates a switch (SW) 309 for switching on and off the conduction between the noncontacting interface 400 and the antenna coil 301a (the parallel tuning circuit 301).

This switch (SW) 309 is normally ON (connected) and turned off when a Vcc voltage is applied from the contact terminal C1 of the contacting interface 401 to the VCC (normally 5V) terminal.

The operation of the radio combination card according to the first embodiment of the present invention will be described below.

For example, the card 300 is inserted into a terminal apparatus, and the Vcc voltage is applied from the contact terminal C1 of the contacting interface 401 of the card 300 to the VCC (normally 5V) terminal. Consequently, the switch (SW) 309 is turned off.

Subsequently, contacting data exchange is performed via the CLK terminal, RST terminal, and I/O port.

That is, while contacting data exchange is performed, the switch (SW) 309 is kept OFF, so the noncontacting interface 400 is held inoperative.

Accordingly, even if the receiving antenna (parallel tuning circuit 301) receives a certain radio wave while contacting data exchange or contacting driving is performed, none of the power generator 302, the clock generating circuit (clock generating means) 307, the demodulation circuit (demodulating means) 303, the modulation circuit (modulating means) 304, and the reset signal generating circuit 308 operates. This allows the contacting driving or contacting data exchange to be kept performed.

Second Embodiment

Figure 4:
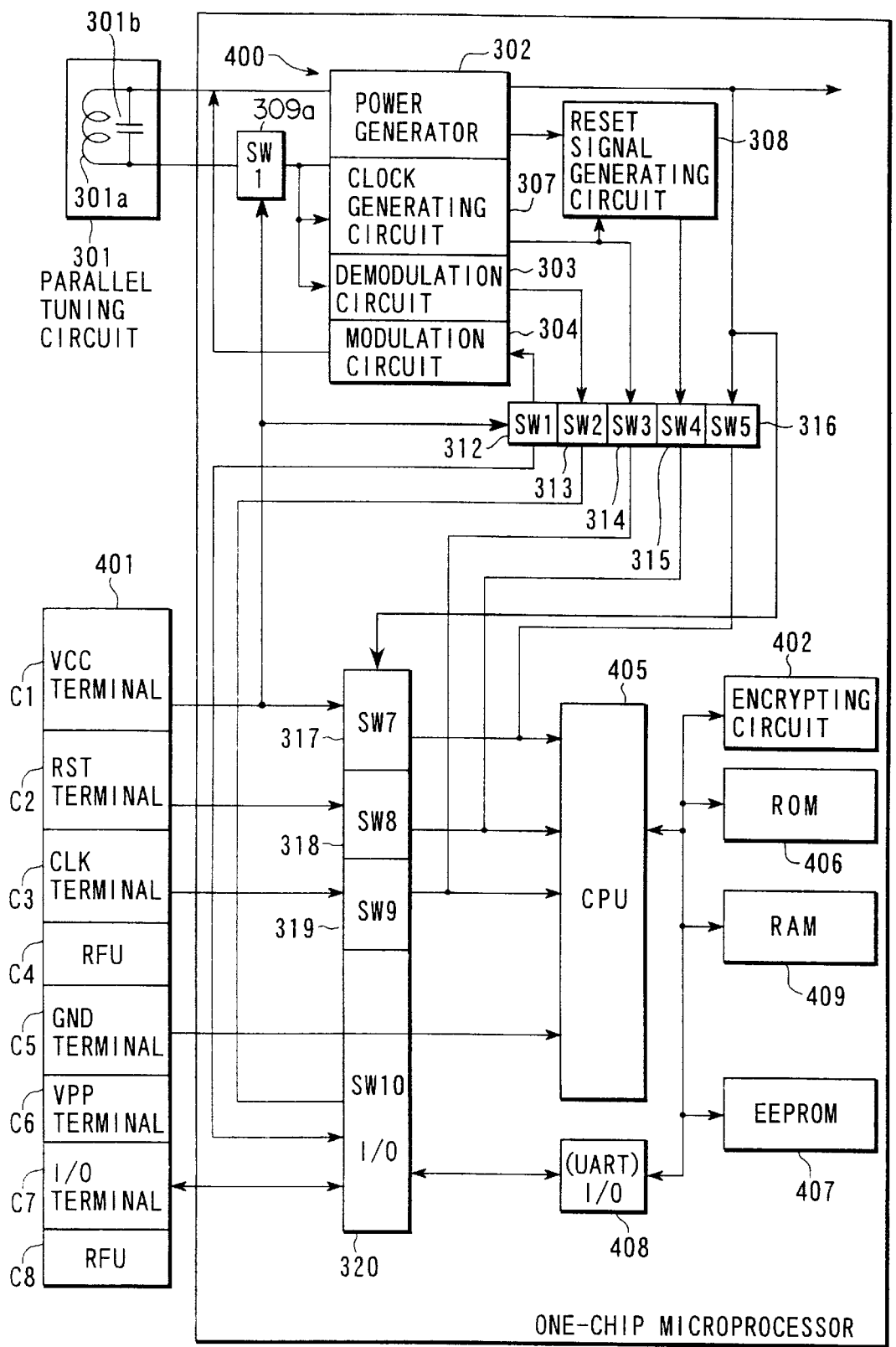
FIG. 4 is a block diagram showing the arrangement of a one-chip microprocessor 310 embedded in a radio combination card 300 according to the second embodiment of the present invention.

The second embodiment of the present invention will be described below with reference to FIG. 4.

In this second embodiment, the arrangements shown in FIGS. 1 and 2 are similarly applied, and the internal arrangement of a radio combination card 300 partially differs from that shown in FIG. 3. So, a description of identical portions will be omitted.

The radio combination card 300 incorporates a switch (SW1) 309a for switching on and off the conduction between a noncontacting interface 400 and an antenna coil (parallel tuning circuit 301).

This switch (SW1) 309a is normally ON (connected) and turned off when a Vcc voltage is applied from a contact terminal C1 of a contacting interface 401 to a VCC (normally 5V) terminal.

In the second embodiment, in addition to this switch (SW1) 309a, switches (SW2, SW3, SW4, SW5, and SW6) 312, 313, 314, 315, and 316 are connected to a power generator 302, a clock generating circuit (clock generating means) 307, a demodulation circuit (demodulating means) 303, a modulation circuit (modulating means) 304, and a reset signal generating circuit 308, respectively, of the noncontacting interface 400.

These switches (SW2 to SW6) 312 to 316 are normally ON (connected) and turned off when the Vcc voltage is applied from the contact terminal C1 of the contacting interface 401 to the VCC (normally 5V) terminal.

The switches (SW2 to SW6) 312 to 316 inhibit signal inputs and outputs via the noncontacting interface 400.

That is, while contacting data exchange or contacting driving is performed, the switches (SW2 to SW6) 312 to 316 completely inhibit signal inputs and outputs via the noncontacting interface 400 and prevent operation errors.

Additionally, in this second embodiment, switches (SW7, SW8, SW9, and SW10) 317, 318, 319, and 320 are connected to the contact terminal C1 (VCC) and other contact terminals C2 (RST), C3 (CLK), and C7 (I/O), respectively, of the contacting interface 401.

These switches (SW7 to SW10) 317 to 320 are normally ON (connected) and turned off when the Vcc voltage is applied from the power generator 302 of the noncontacting interface 400.

The switches (SW7 to SW10) 317 to 320 inhibit signal inputs and outputs via the contacting interface 401.

That is, while noncontacting data exchange or noncontacting driving is performed, the switches (SW7 to SW10) 317 to 320 completely inhibit signal inputs and outputs via the contacting interface 401 and prevent operation errors.

As described above, each of the first and second embodiments of the present invention includes an operation inhibiting means for inhibiting the operation of the noncontacting interface 400 while the card is driven via the contacting interface 401. Therefore, no operation error occurs even if electric waves are radiated in the environment while information is exchanged via the contacting interface 401.

Also, each of the first and second embodiments of the present invention includes a means for cutting off the conduction between the noncontacting interface 400 and the antenna coil 301a (parallel tuning circuit 301) while the card is driven via the contacting interface 401. Accordingly, no operation error occurs even if electric waves are radiated in the environment while information is exchanged via the contacting interface 401.

In the first and second embodiments of the present invention as described above, the noncontacting interface 400 of the microprocessor includes the power generator 302 which operates in accordance with an output from the parallel tuning circuit 301, the clock generating circuit (clock generating means) 307, the demodulation circuit (demodulating means) 303, the modulation circuit (modulating means) 304, and the reset signal generating circuit 308. A switch for switching on and off the conduction between the noncontacting interface 400 and the parallel tuning circuit 301 is also included. This switch is turned off when the Vcc voltage is applied via the contacting interface 401. Therefore, even if electric waves are radiated in the environment while information is exchanged via the contacting interface 401, the noncontacting interface 400 does not operate at all, so no operation error takes place.

The above first and second embodiments of the present invention can be summarized as follows.

1. A radio combination card having contacting and noncontacting interfaces and driven via the contacting or noncontacting interface is characterized by comprising an operation inhibiting means for inhibiting the operation of the noncontacting interface while the card is driven via the contacting interface.

2. A radio combination card described in item 1 above is characterized in that the operation inhibiting means for inhibiting the operation of the noncontacting interface while the card is driven via the contacting interface is a means for cutting off the conduction between the noncontacting interface and an antenna coil.

3. A radio combination card having contacting and noncontacting interfaces and driven via the contacting or noncontacting interface is characterized by comprising a switch for switching on and off the conduction between the noncontacting interface and an antenna coil, wherein the switch is turned off when the Vcc voltage is applied via the contacting interface.

4. A radio combination card having contacting and noncontacting interfaces and driven via the contacting or noncontacting interface is characterized by comprising an inhibiting means for inhibiting signal inputs and outputs via the contacting interface while the card is driven via the noncontacting interface.

5. A radio combination card described in item 4 above is characterized in that the inhibiting means comprises a means for inhibiting signal inputs and outputs between the contacting interface and a control circuit.

6. A radio combination card described in item 4 above is characterized in that the inhibiting means comprises a means for turning off the switches SW7, SW8, SW9, and SW10 connected between the contacting terminals C1 (VCC), C2 (RST), C3 (CLK), and C7 (I/O), respectively, of the contacting interface and the control circuit.

7. A radio combination card having contacting and noncontacting interfaces and driven via the contacting or noncontacting interface is characterized by comprising an inhibiting means for inhibiting signal inputs and outputs via the noncontacting interface while the card is driven via the contacting interface.

8. A radio combination card described in item 7 above is characterized in that the inhibiting means comprises a means for inhibiting signal inputs and outputs between the noncontacting interface and a control circuit.

9. A radio combination card described in item 7 above is characterized in that the inhibiting means comprises the switches SW2, SW3, SW4, SW5, and SW6 between the power generator 302, the clock generating circuit (clock generating means) 307, the demodulation circuit (demodulating means) 303, the modulation circuit (modulating means) 304, and the reset signal generating circuit 308, respectively, of the noncontacting interface and the control circuit, and turns off the switches SW2 to SW6 when the Vcc voltage is applied from the contact terminal C1 of the contacting interface to the VCC (normally 5V) terminal.

10. A radio combination card having contacting and noncontacting interfaces and driven via the contacting or noncontacting interface is characterized by comprising a first inhibiting means for inhibiting signal inputs and outputs via the noncontacting interface while the card is driven via the contacting interface, and a second inhibiting means for inhibiting signal inputs and outputs via the contacting interface while the card is driven via the noncontacting interface.

The first and second embodiments of the present invention as described in detail above can provide a portable electronic device including a composite IC card having contacting and noncontacting interfaces and capable of well maintaining the reliability as a composite IC card by preventing operation errors when driven from either interface, and an IC module for the composite IC card.

Third Embodiment

The third embodiment of the present invention will be described below with reference to FIG. 5.

The configuration of a radio card system shown in FIG. 1 and the arrangement of a radio combination card shown in FIG. 2 are similarly applied to this third embodiment.

The arrangement of a radio combination card 300 will be described in detail below with reference to FIGS. 2 and 5.

Figure 5:
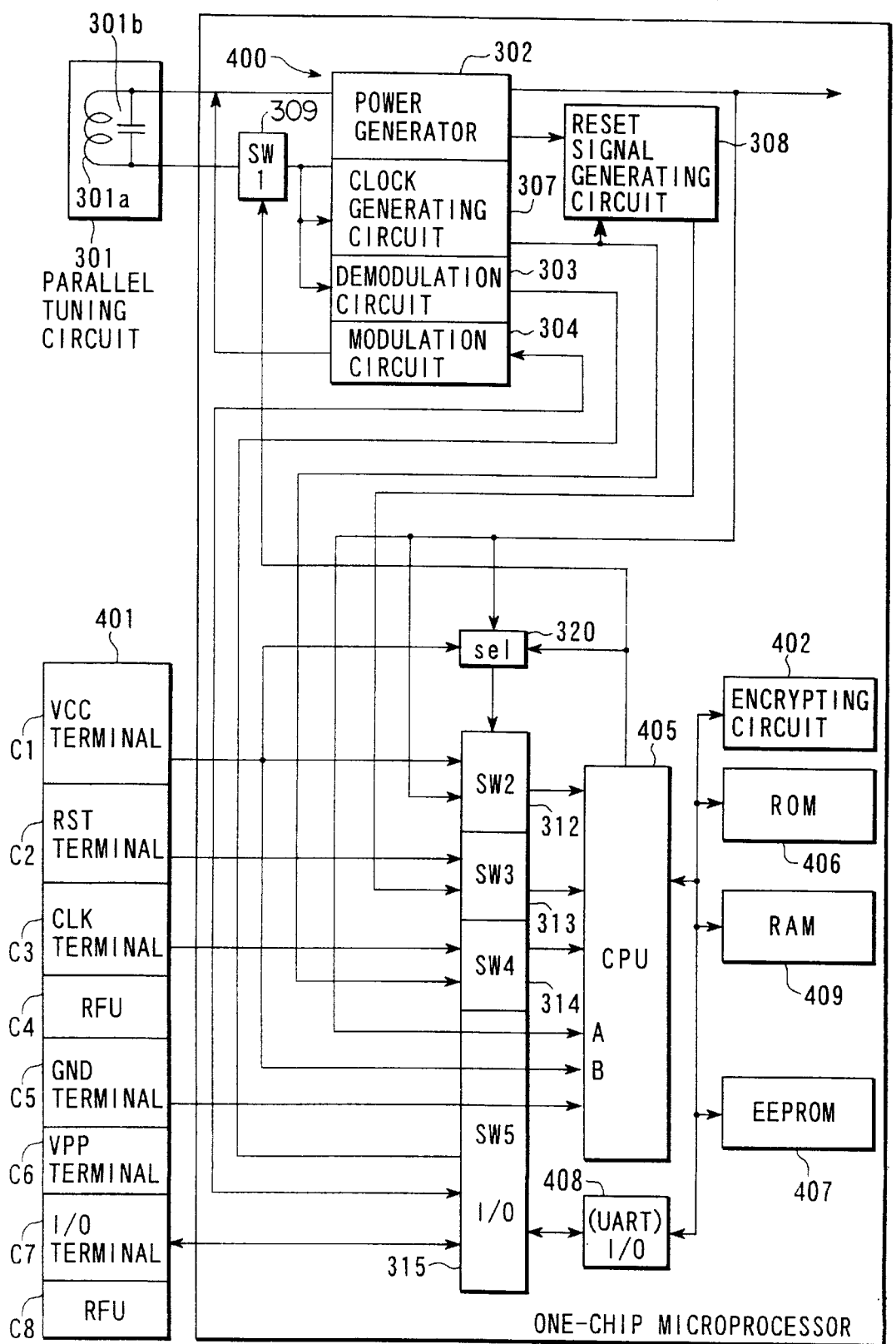
FIG. 5 is a block diagram showing the arrangement of a one-chip microprocessor 310 embedded in a radio combination card 300 according to the third embodiment of the present invention.

As shown in FIGS. 2 and 5, a contacting interface 401 for contacting a terminal apparatus is formed on the card surface of the radio combination card 300. This contacting interface 401 includes contact terminals C1 (VCC), C2 (RST), C3 (CLK), C4 (a space terminal for the future: RFU), C5 (GND), C6 (VPP: unused), C7 (I/O), and C8 (a space terminal for the future: RFU).

A one-chip microprocessor 310 as shown in FIGS. 2 and 5 is embedded in the radio combination card 300.

As shown in FIG. 5, this one-chip microprocessor 310 includes a series of data processors such as a control CPU (Central Processing Unit) 405 corresponding to a control logic circuit 305, a ROM 406 storing control programs, a data memory 407 which is an EEPROM for recording a password (e.g., four digits) and data, an interface circuit 408 such as a UART, a RAM 409 for temporary storage, and an encrypting circuit 402.

When contacting data exchange is performed by using this radio combination card 300, a terminal apparatus into which the card 300 is inserted supplies a voltage from the contact terminal C1 to a VCC (normally 5V) terminal and applies a signal from the contact terminals C3, C2, and C5 to CLK (clock), RST (reset), and GND (ground potential) terminals, respectively. Simultaneously, the contact terminal C7 is connected to an I/O port to exchange data.

The individual units are formed as an IC chip on a single board.

Also, these units are connected to the terminals through wires, and the terminals and the board mounting the IC chip are integrated and handled as an IC module. Accordingly, as shown in FIG. 2, these terminals are so embedded in the card as to be exposed to the card surface.

The card 300 also includes a parallel tuning circuit 301 for noncontacting data exchange.

That is, the parallel tuning circuit 301 receives a two-phase phase-modulated wave signal (first two-phase phase-modulated wave signal) from a transmitting antenna 201 of a radio card reader·writer 200 and transmits a two-phase phase-modulated wave signal (second two-phase phase-modulated wave signal) with a carrier frequency f0/2. This parallel tuning circuit 301 is composed of a loop antenna coil 301a and a tuning capacitor 301b.

The loop antenna coil 301a of this parallel tuning circuit 301 receives signals and at the same time transmits the carrier frequency f0/2. Since power for generating a power supply voltage must be efficiently extracted from a received radio wave, the loop antenna coil 301a is tuned to a carrier frequency f0 of the received two-phase phase-modulated wave signal.

This carrier frequency for transmission can also be a fraction of an integer multiple, instead of ½, of the carrier frequency of the received two-phase phase-modulated wave signal.

The loop antenna coil 301a simply transmits and receives signals, so a single coil can be used for both transmission and reception. However, separate coils can also be used for transmission and reception.

To perform noncontacting data exchange, the one-chip microprocessor 310 incorporates a noncontacting interface circuit 400 for exchanging data via the parallel tuning circuit 301.

This noncontacting interface circuit 400 includes a power generator 302, a clock generating circuit (clock generating means) 307, a demodulation circuit (demodulating means) 303, a modulation circuit (modulating means) 304, and a reset signal generating circuit 308. The power generator 302 generates power to be supplied to the whole internal circuit of the radio combination card 300 by using the two-phase phase-modulated wave signal from the parallel tuning circuit 301. The clock generating circuit 307 generates operating clocks from an analog signal received via the parallel tuning circuit 301. The demodulation circuit 303 converts the analog signal received via the parallel tuning circuit 301 into a digital signal to be read out by the CPU 405 of the one-chip microprocessor 310. The modulation circuit 304 modulates an oscillation circuit output by using a signal from the CPU 405 and transmits the modulated output from the loop antenna (transmitting) coil 301a of the parallel tuning circuit 301. The reset signal generating circuit 308 generates a reset signal on the basis of the clocks generated by the clock generating circuit 307.

The radio combination card 300 incorporates a switch (SW) 309 for switching on and off the conduction between the noncontacting interface 400 and the antenna coil 301a of the parallel tuning circuit 301.

This switch (SW) 309 is normally ON (connected) in the initial state and turned off by the CPU 405 when a Vcc voltage is applied from the contact terminal C1 of the contacting interface 401 to the VCC (normally 5V) terminal.

In this third embodiment, in addition to the switch (SW1) 309 described above, switches (SW2, SW3, SW4, and SW5) 312, 313, 314, and 315 are connected to the control terminals C1 (VCC), C2 (RST), C3 (CLK), and C7 (I/O), respectively.

One input terminal of each of these switches (SW2 to SW5) 312 to 315 is connected to a corresponding one of the contact terminals C1 (VCC), C2 (RST), C3 (CLK), and C7 (I/O).

The other input terminal of the switch (SW2) 312 is connected to the power generator 302 of the noncontacting interface 400 so as to receive the Vcc voltage generated by the power generator 302.

Note that one of the two input terminals of the switch (SW2) 312 is enabled by an output from a selector circuit (sel) 320 controlled by the CPU 405.

Note also that the other input terminal of the switch (SW2) 312 is initially so selected by the CPU 405 as to receive the Vcc voltage generated by the power generator 302.

The other input terminal of the switch (SW3) 313 is connected to the reset signal generating circuit 308 of the noncontacting interface 400 so as to receive the reset signal generated by the reset signal generating circuit 308.

Note that one input terminal of the switch (SW3) 313 is enabled by an output from the selector circuit (sel) 320 controlled by the CPU 405.

Note also that the other input terminal of the switch (SW3) 313 is initially so selected by the CPU 405 as to receive the reset signal generated by the reset signal generating circuit 308.

The other input terminal of the switch (SW4) 314 is connected to the clock generating circuit 307 of the noncontacting interface 400 so as to receive the clock signal generated by the clock generating circuit 307.

Note that one input terminal of the switch (SW4) 314 is enabled by an output from the selector circuit (sel) 320 controlled by the CPU 405.

Note also that the other input terminal of the switch (SW4) 314 is initially so selected by the CPU 405 as to receive the clock signal generated by the clock signal generating circuit 307.

The other input terminal of the switch (SW5) 315 is connected to the demodulation circuit (demodulating means) 303 of the noncontacting interface 400.

Also, one output terminal of this switch (SW5) 315 is connected to the modulation circuit (modulating means) 304 of the noncontacting interface 400.

Note that one input or output terminal of the switch (SW5) 315 is enabled by an output from the selector circuit (sel) 320 controlled by the CPU 405 so as to be selectively connected to the output terminal of the demodulation circuit (demodulating means) 303, the input terminal of the modulation circuit (modulating means) 304, or the contact terminal C7 (I/O).

Note also that the switch (SW5) 315 is initially connected to the output terminal of the demodulation circuit (demodulating means) 303 and the input terminal of the modulation circuit (modulating means) 304 by the CPU 405.

The contact terminal C1 of the contacting interface 401 and the output terminal of the power generator 302 are connected to terminals A and B, respectively, of the CPU 405. This allows the CPU 405 to check whether the radio combination card 300 is driven by the contacting interface 401 or the noncontacting interface 400 when the CPU 405 performs initialization upon activation of the radio combination card 300.

The CPU 405 reads out a program for performing initialization stored in the RAM 406 and performs initialization.

The operation of the radio combination card with the above arrangement will be described below with reference to a flow chart shown in FIGS. 6A and 6B.

For example, when the card 300 is inserted into a terminal apparatus, the Vcc voltage is applied from the contact terminal C1 of the contacting interface 401 of the card 300 to the VCC (normally 5V) terminal (ST1). Consequently, the switch (SW) 309 is turned off.

When the Vcc voltage is applied from the contact terminal C1 to the VCC (normally 5V) terminal, the selector circuit (sel) 320 of the card 300 outputs a selection signal "1" to the switches (SW2, SW3, SW4, and SW5) 312, 313, 314, and 315 so as to selectively connect the contact terminals C1 (VCC), C2 (RST), C3 (CLK), and C7 (I/O), respectively (ST101).

After that, the CLK terminal C3 and the RST terminal C2 supply the clock signal and the reset signal, respectively (ST2 and ST3), and the CPU 405 starts initialization (ST102).

In this initialization, the CPU 405 detects the states of the input terminals A and B and checks whether the radio combination card 300 is activated by the contacting interface 401 or the noncontacting interface 400 (ST103).

If the input terminal A is "1" and the input terminal B is "0", the card 300 is activated by the noncontacting interface 400.

If the input terminal A is "0" and the input terminal B is "1", the card 300 is activated by the contacting interface 401.

If both of the input terminals A and B are "0" or "1", an operation error has occurred.

If this error is detected, the CPU 405 stops the operation.

Since the card 300 is driven by the contacting interface 401, the CPU 405 holds the states of the input terminals A and B in a predetermined area of the RAM 409 (ST104).

That is, the CPU 405 stores (1,0) in the predetermined area of the RAM 409 if the card 300 is activated by the noncontacting interface 400, and stores (0,1) in this area if the card 300 is activated by the contacting interface 400.

Next, on the basis of the information stored in the RAM 309, the CPU 405 checks whether the card 300 is activated by the contacting interface 401, i.e., whether the pattern stored in the RAM 409 is (0,1) (ST105).

If the card 300 is activated by the contacting interface 401 and the pattern in the predetermined area of the RAM 409 is (0,1), the CPU 405 outputs a selection signal for turning off the switch (SW1) 309 (ST106).

The switch (SW1) 309 is turned off by this selection signal.

This selection signal is also supplied to the selector circuit (sel) 320 and so controls the selector circuit (sel) 320 that the switches (SW2, SW3, SW4, and SW5) 312, 313, 314, and 315 keep selecting the contact terminals C1 (VCC), C2 (RST), C3 (CLK), and C7 (I/O), respectively (ST106).

In this manner, the selector circuit (sel) 320 causes the switches (SW2, SW3, SW4, and SW5) 312, 313, 314, and 315 to keep selecting the contact terminals C1 (VCC), C2 (RST), C3 (CLK), and C7 (I/O), respectively. After that, a command is received from the terminal apparatus via the I/O port, and contacting data exchange is performed via the I/O port in accordance with the command.

That is, while contacting data exchange is performed, the switch (SW1) 309 is kept OFF, and the switches (SW2, SW3, SW4, and SW5) 312, 313, 314, and 315 keep selecting the contact terminals C1 (VCC), C2 (RST), C3 (CLK), and C7 (I/O), respectively. Accordingly, even if the receiving antenna coil 301*a* of the parallel tuning circuit 301 receives some radio waves while contacting data exchange or contacting driving is performed, the radio combination card 300 does not cause any operation error, so the contacting driving or contacting data exchange is kept performed.

On the other hand, if the card 300 is driven by the noncontacting interface 400, the switch (SW1) 309 is normally ON (connected). Therefore, the receiving antenna coil 301*a* of the parallel tuning circuit 301 receives radio waves (ST201), and the power generator 302, the clock generating circuit (clock generating means) 307, the demodulation circuit (demodulating means) 303, the modulation circuit (modulating means) 304, and the reset signal generating circuit 308 operate (ST202).

When the power generator 302 applies a voltage, the selector circuit (sel) 320 outputs a selection signal "0" (ST202).

The switches (SW2, SW3, SW4, and SW5) 312, 313, 314, and 315 initially connect to the power generator 302, the clock generating circuit (clock generating means) 307, the demodulation circuit (demodulating means) 303, the modulation circuit (modulating means) 304, and the reset signal generating circuit 308, respectively. The selection signal "0" does not change the states of these switches (SW2 to SW5) 312 to 315.

After that, the clock generating circuit (clock generating means) 307 and the reset signal generating circuit 308 supply the clock signal and the reset signal, respectively, and the CPU 405 starts initialization (ST102).

In this initialization, the CPU 405 detects the states of the input terminals A and B and checks whether the radio combination card 300 is activated by the contacting interface 401 or the noncontacting interface 400 (ST103).

Since the card 300 is activated by the noncontacting interface 400, the CPU 405 stores the states of the input terminals A and B as (1,0) in the predetermined area of the RAM 409 (ST103).

Next, on the basis of the information stored in the RAM 309, the CPU 405 checks whether the card 300 is activated by the contacting interface 401 or the noncontacting interface 400 (ST105 and ST107).

If the card 300 is activated by the noncontacting interface 400 and the pattern in the predetermined area of the RAM 409 is (1,0) (ST106), the CPU 405 outputs a selection signal "0" to the selector circuit (sel) 320 and the switch (SW1) 309 (ST108).

This selection signal "0" holds the initial states of the individual switches.

After that, the switches (SW2, SW3, SW4, and SW5) 312, 313, 314, and 315 selectively connect to the power generator 302, the clock generating circuit (clock generating means) 307, the demodulation circuit (demodulating means) 303, the modulation circuit (modulating means) 304, and the reset signal generating circuit 308. That is, these switches (SW2 to SW5) 312 to 315 are connected to the noncontacting interface 400.

The CPU 405 completes the initialization in steps ST102 to ST108 described above.

In this initialization, the CPU 405 also checks the hardware such as the ROM 406, the RAM 409, and the EEPROM 407.

When the initialization is complete, the card 300 can exchange data with an external apparatus.

When the card 300 is driven by the contacting interface 401, the external apparatus (reader·writer) cancels the reset signal applied to the contact terminal C2 after 40,000 clocks are supplied to the contact terminal C3.

Analogously, the reset signal generating circuit 308 cancels the reset signal after a predetermined number of clocks are supplied by the clock generating circuit 307.

When the reset signal applied to the contact terminal C2 or the reset signal from the reset signal generating circuit 308 is canceled, the CPU 405 outputs an initial response signal (ATR) to the external apparatus (reader·writer) via the selected one of the contacting interface 401 and the noncontacting interface 400.

This initial response signal (ATR) from the card 300 enables the external apparatus (reader·writer) to exchange commands with the card 300, so the apparatus transmits a command to the card 300.

The card 300 receives this command via the currently selected one of the contacting interface 401 and the noncontacting interface 400 (ST110).

When the command is received, the CPU 405 compares the states of the input terminals A and B with the pattern (initial state) stored in the RAM 409 (ST111).

If the states of the input terminals A and B match the pattern (initial state) stored in the RAM 409 (ST112), the CPU 405 executes the received command and outputs the processing result to the external apparatus (ST113).

After that, the card and the external apparatus similarly exchange commands and data.

If there is neither invalid attempt nor operation error from the external apparatus, the states of the input terminals A and B and the pattern (initial state) stored in the RAM 409 must match. Therefore, if the states of the input terminals A and B are different from the pattern (initial state) stored in the RAM 409, the CPU 405 outputs an error signal and stops the operation (ST114).

A signal received by the receiving antenna coil 301*a* of the parallel tuning circuit 301 is converted into a digital signal by the demodulation circuit (demodulating means) 303 and supplied to the CPU 405 via the UART (I/O) 408. The CPU 405 appropriately processes the signal and stores the processed signal in the RAM 409 or the like where necessary.

Also, a signal to be transmitted to the terminal is output from the UART (I/O) 408 to the modulation circuit 304 and transmitted from the antenna coil of the parallel tuning circuit 301 by modulating the output from the clock generating circuit 307.

In this way, noncontacting data exchange is performed.

In this embodiment, when performing initialization, the CPU 405 detects the states of the input terminals A and B and checks whether the radio combination card 300 is activated by the contacting interface 401 or the noncontacting interface 400. The CPU 405 holds the result in the RAM 409.

While the card and a terminal apparatus are exchanging information, the CPU 405 compares the states of the input terminals A and B with the pattern held in the RAM 409 to check whether the states change.

If the states of the input terminals A and B match the pattern held in the RAM 409, the CPU 405 determines that the operation is normal. However, if the states of the input terminals A and B are different from the pattern held in the RAM 409, it is expected that some operation error has occurred. Therefore, the CPU 405 outputs an error response to the terminal apparatus and stops the operation.

Figure 7:
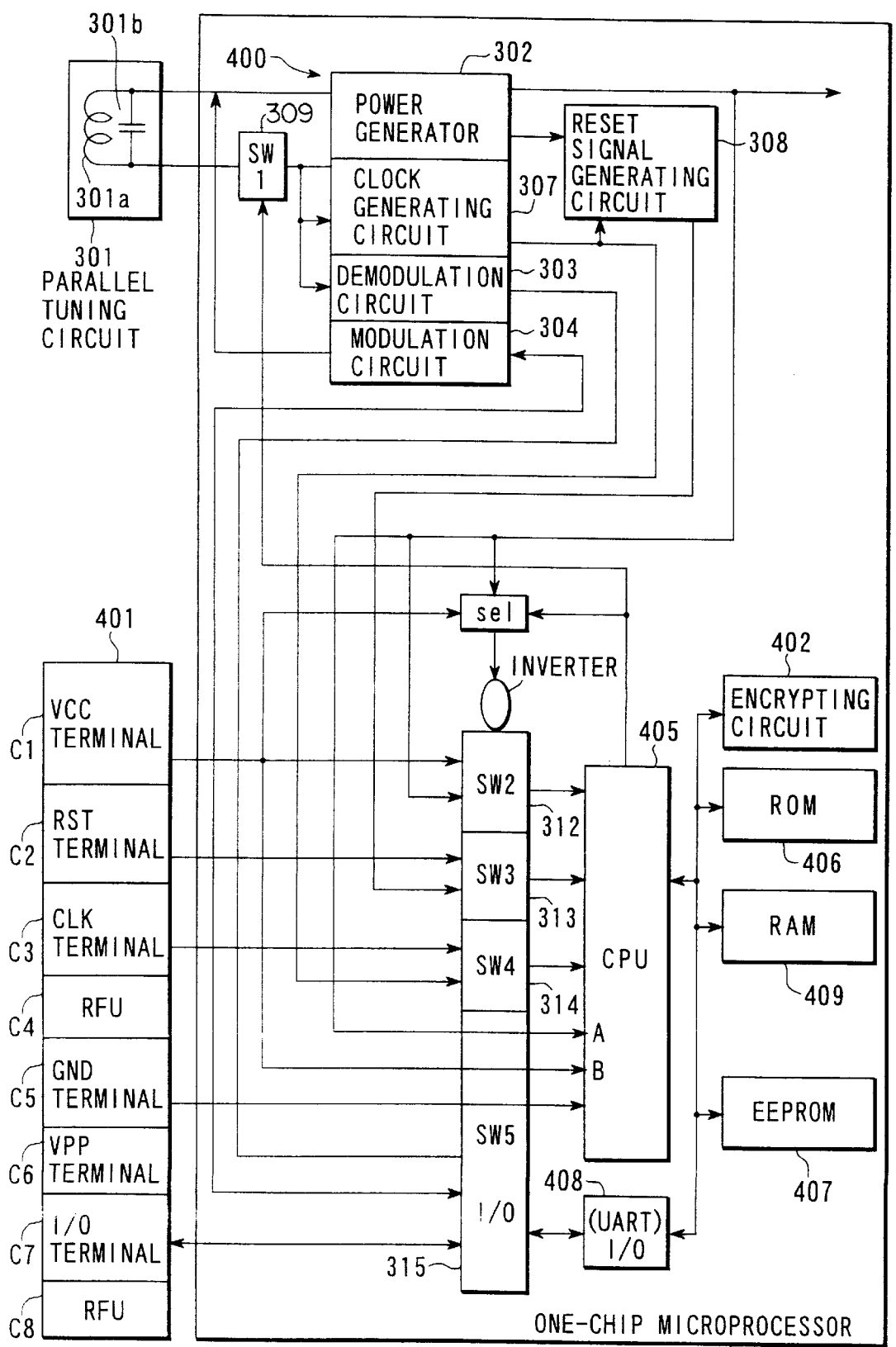
FIG. 7 is a block diagram showing the arrangement of a one-chip microprocessor 310 embedded in a radio combination card 300 according to a modification of the third embodiment of the present invention.

Note that when the switches (SW2, SW3, SW4, and SW5) 312, 313, 314, and 315 initially select the contact terminals C1 (VCC), C2 (RST), C3 (CLK), and C7 (I/O), respectively, a similar operation can be performed by using an inverted signal of an output signal from the selector circuit (sel) 320 as a selection signal as shown in FIG. 7.

As described above, the third embodiment includes an inhibiting means for inhibiting the operation of the noncontacting interface 400 while the card 300 is driven by the contacting interface 401. Hence, no operation error occurs even if electric waves are radiated in the environment while information is exchanged via the contacting interface 401.

Also, the above third embodiment includes a means for cutting off the conduction between the noncontacting interface 400 and the antenna coil 301a of the parallel tuning circuit 301. Accordingly, no operation error occurs even if electric waves are radiated in the environment while information is exchanged via the contacting interface 401.

Furthermore, in the above third embodiment, the noncontacting interface 400 of the microprocessor 310 includes the power generator 302 which operates in accordance with an output from the parallel tuning circuit 301, the clock generating circuit (clock generating means) 307, the demodulation circuit (demodulating means) 303, the modulation circuit (modulating means) 304, and the reset signal generating circuit 308. The switch 309 for switching on and off the conduction between the noncontacting interface 400 and the parallel tuning circuit 301 is also included. This switch 309 is turned off when the Vcc voltage is applied via the contacting interface 401. Therefore, even if electric waves are radiated in the environment while information is exchanged via the contacting interface 401, the noncontacting interface 400 does not operate at all, so no operation error takes place.

Fourth Embodiment

The fourth embodiment of the present invention will be described below with reference to FIG. 8.

In this fourth embodiment, the arrangements shown in FIGS. 1 and 2 are similarly applied, and the internal arrangement of a radio combination card 300 partially differs from that shown in FIG. 5. So, a description of identical portions will be omitted.

Figure 8:
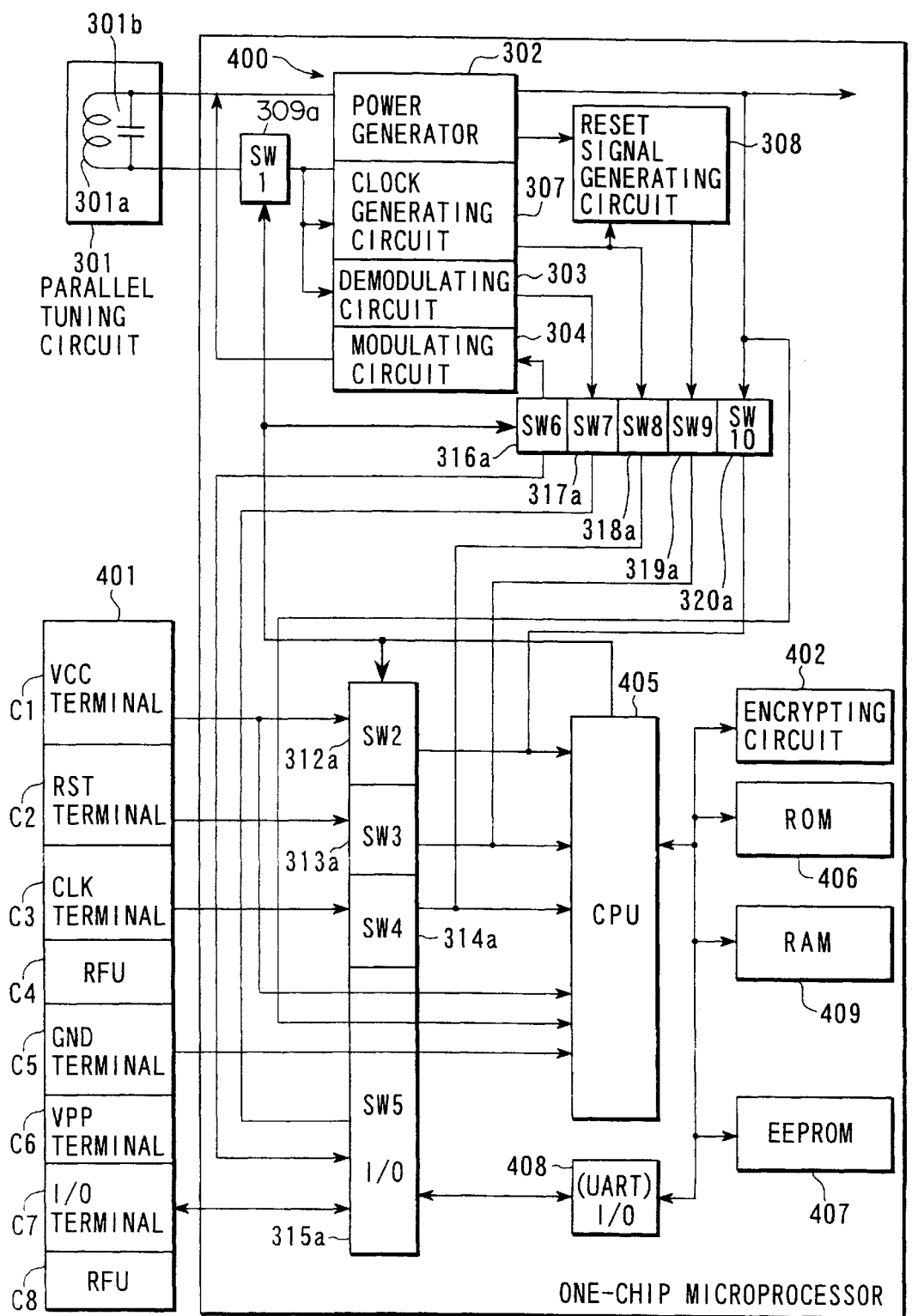
FIG. 8 is a block diagram showing the arrangement of a one-chip microprocessor 310 embedded in a radio combination card 300 according to the fourth embodiment of the present invention.

That is, as shown in FIG. 8, a radio combination card 300 incorporates a switch (SW1) 309a for switching on and off the conduction between a noncontacting interface 400 and an antenna coil (parallel tuning circuit 301).

This switch (SW1) 309a is normally ON (connected) and turned off when a Vcc voltage is applied from a contact terminal C1 of a contacting interface 401 to a VCC (normally 5V) terminal.

In the fourth embodiment, in addition to this switch (SW1) 309a, switches (SW2, SW3, SW4, and SW5) 312a, 313a, 314a, and 315a are connected to a power generator 302, a clock generating circuit (clock generating means) 307, a demodulation circuit (demodulating means) 303, a modulation circuit (modulating means) 304, and a reset signal generating circuit 308, respectively, of the noncontacting interface 400.

These switches (SW2 to SW5) 312a to 315a are normally ON (connected) and turned off when the Vcc voltage is applied from the contact terminal C1 of the contacting interface 401 to the VCC (normally 5V) terminal.

The switches (SW2 to SW5) 312a to 315a inhibit signal inputs and outputs via the noncontacting interface 400.

That is, while contacting data exchange or contacting driving is performed, the switches (SW2 to SW5) 312a to 315a completely inhibit signal inputs and outputs via the noncontacting interface 400 and prevent operation errors.

Additionally, in this fourth embodiment, switches (SW6, SW7, SW8, SW9, and SW10) 316a, 317a, 318a, 319a, and 320a are connected to the contact terminal C1 (VCC) and other contact terminals C2 (RST), C3 (CLK), and C7 (I/O), respectively, of the contacting interface 401.

These switches (SW6 to SW10) 316a to 320a are normally ON (connected) and turned off when the Vcc voltage is applied from the power generator 302 of the noncontacting interface 400.

The switches (SW6 to SW10) 316a to 320a inhibit signal inputs and outputs via the contacting interface 401.

That is, while noncontacting data exchange or noncontacting driving is performed, the switches (SW6 to SW10) 316a to 320a completely inhibit signal inputs and outputs via the contacting interface 401 and prevent operation errors.

As described above, the fourth embodiment of the present invention includes operation inhibiting means for inhibiting the operation of the noncontacting interface 400 while the card is driven via the contacting interface 401. Therefore, no operation error occurs even if electric waves are radiated in the environment while information is exchanged via the contacting interface 401.

Also, the fourth embodiment of the present invention includes a means for cutting off the conduction between the noncontacting interface 400 and the antenna coil (parallel tuning circuit) while the card is driven via the contacting interface 401. Accordingly, no operation error occurs even if electric waves are radiated in the environment while information is exchanged via the contacting interface 401.

Furthermore, in the above fourth embodiment, the noncontacting interface 400 of the microprocessor includes the power generator 302 which operates in accordance with an output from the parallel tuning circuit 301, the clock generating circuit (clock generating means) 307, the demodulation circuit (demodulating means) 303, the modulation circuit (modulating means) 304, and the reset signal generating circuit 308. A switch for switching on and off the conduction between the noncontacting interface 400 and the parallel tuning circuit 301 is also included. This switch is turned off when the Vcc voltage is applied via the contacting interface 401. Therefore, even if electric waves are radiated in the environment while information is exchanged via the contacting interface 401, the noncontacting interface 400 does not operate at all, so no operation error takes place.

The third and fourth embodiments as described above can be summarized as follows.

(1) A radio combination card having contacting and noncontacting interfaces and driven by the contacting or noncontacting interface comprises a selective connecting means for selectively connecting one of the contacting and noncontacting interfaces to a control circuit, a determining means for determining whether the card in driven by the contacting or noncontacting interface, and a holding means for causing the selective connecting means to keep connecting one of the contacting and noncontacting interfaces in accordance with a determination result from the determining means, and inhibiting signal inputs and outputs via the other interface.

(2) The selective connecting means initially selectively connects one of the contacting and noncontacting interfaces to the control circuit and switches to the other interface when the card is driven by the other interface, and the holding means maintains the connection to the other interface on the basis of the determination result from the determining means.

(3) There is provided a radio combination card wherein the contact terminals C1 (VCC), C2 (RST), C3 (CLK), and C7 (I/O) of a contacting interface are connected to a control circuit by the connecting switches (SW2, SW3, SW4, and SW5) 312, 313, 314, and 315, respectively, which are connected to the power generator 302, the clock generating circuit (clock generating means) 307, the demodulation circuit (demodulating means) 303, the modulation circuit (modulating means) 304, and the reset signal generating circuit 308, respectively, of a noncontacting interface, one interface is initially selectively connected to the control circuit, initialization is performed by connecting the switches SW7 to SW10 to the contacting interface when the Vcc voltage is applied from the contact terminal C1 to the VCC (normally 5V) terminal and connecting the switches (SW2 to SW5) 312 to 315 to the noncontacting interface when the power generator 302 applies a voltage, and, in this initialization, whether the card is driven by the contacting or noncontacting interface is checked, and the switches (SW2 to SW5) 312 to 315 are kept connected until deactivation.

As described above, the third and fourth embodiments of the present invention can provide a portable electronic device including a composite IC card having contacting and noncontacting interfaces and capable of well maintaining the reliability as a composite IC card by preventing operation errors when driven from either interface, and an IC module for the composite IC card.

Fifth Embodiment

The fifth embodiment of the present invention will be described below with reference to FIGS. 9 to 12.

Note that in this fifth embodiment, the arrangements shown in FIGS. 1 and 2 are similarly applied.

Figure 6A:
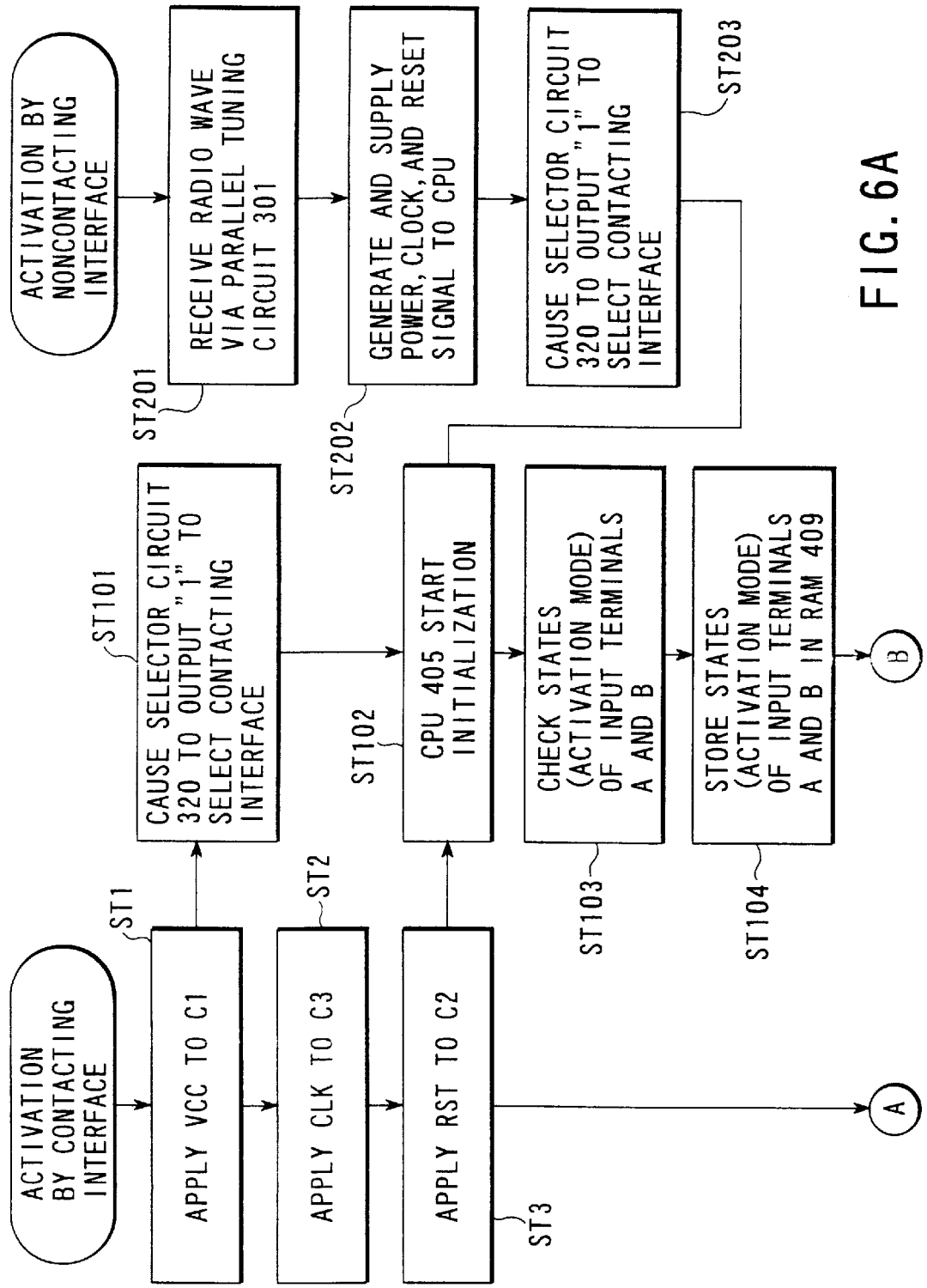
FIGS. 6A and 6B are flow charts for explaining the operation of a radio card system using a radio combination card as a data storage medium applied as a composite IC card as a kind of portable electronic device according to the present invention.
Figure 6B:
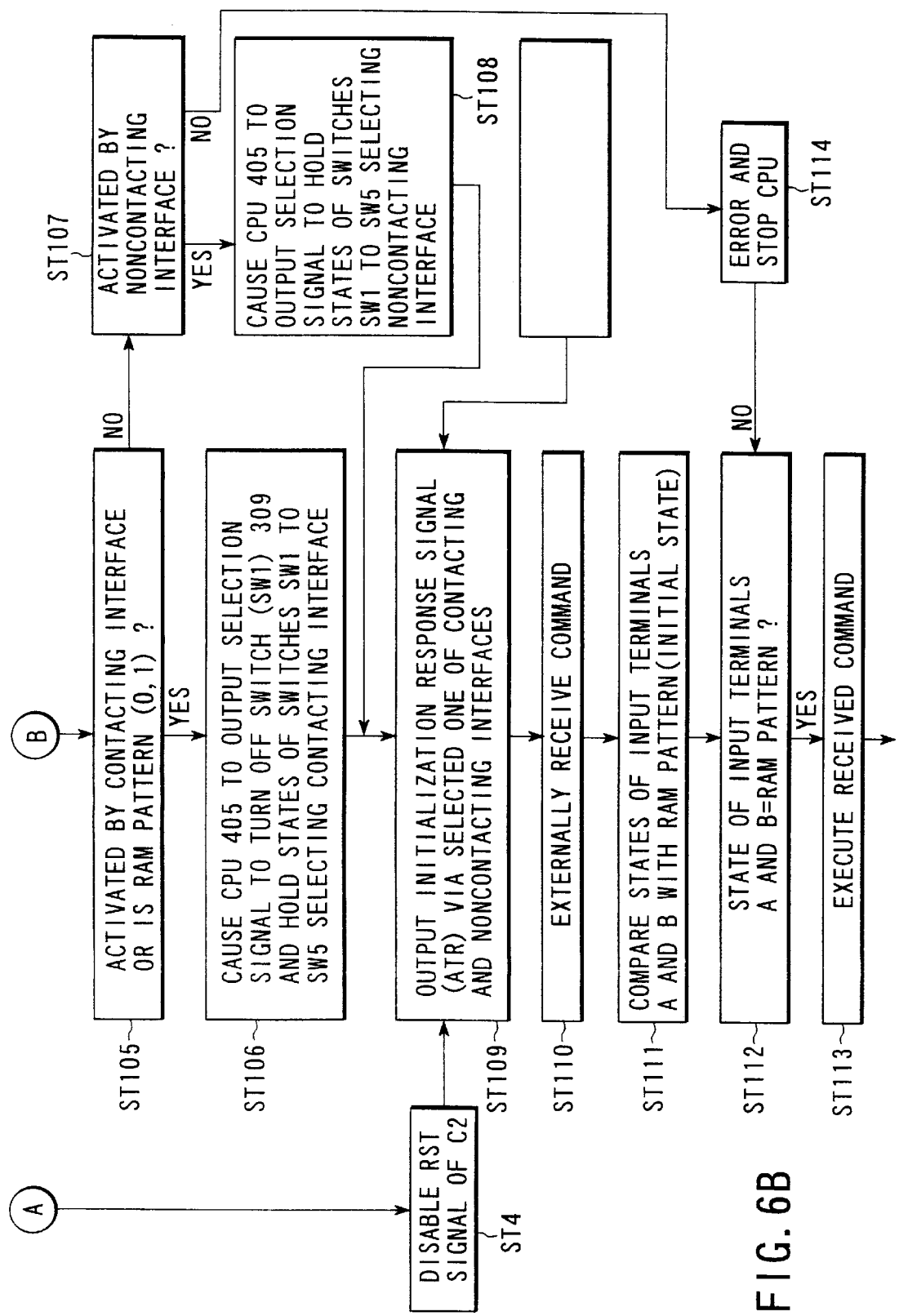

Note also that in this fifth embodiment, the arrangements shown in FIGS. 5 and 7 and the flow chart shown in FIGS. 6A and 6B are also similarly applied.

In this embodiment, a common IC such as a memory is used and a CPU 405 is operated in both contacting and noncontacting responses to an external apparatus.

In this embodiment, therefore, switching is performed between commands executable in contacting and noncontacting responses to an external apparatus, thereby holding the independence of contacting and noncontacting responses while the common memory is used.

That is, a ROM 406 stores subroutine programs for processing various applications and commands. In accordance with a command received from an external apparatus, the CPU 405 reads out a subroutine program from the ROM 406 and executes the program.

A system area of an EEPROM 407 stores command tables (lists) showing the correspondence between commands received from an external apparatus and the subroutine programs in the ROM 406 as various kinds of definition information. Different command tables (lists) are used for contacting and noncontacting responses.

Also, a user area of the EEPROM 407 stores various kinds of transaction information such as outstanding balance data and transaction records.

That is, a command list for a contacting response is set as shown in FIG. 9, and a command list for a noncontacting response is set as shown in FIG. 10.

These settings are made by writing the command tables (lists) by the manufacturer or issuer when the card is issued.

Figure 12:
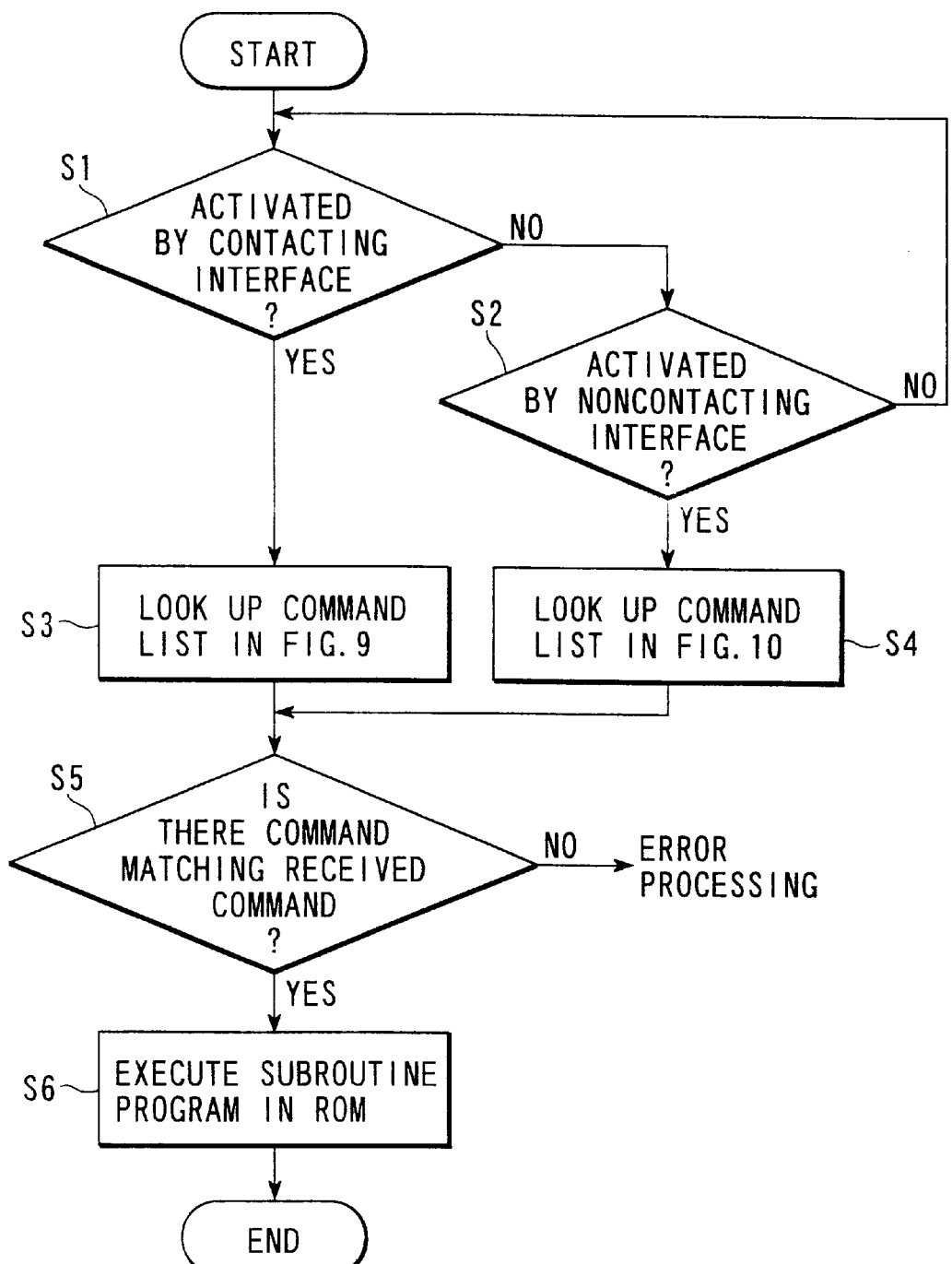
FIG. 12 is a flow chart for explaining the operation of a CPU.

The CPU 405 performs processing based on a flow chart as shown in FIG. 12.

That is, when the card is activated by a contacting interface 401 and a pattern in a predetermined area of a RAM 409 is (0,1), the CPU 405 looks up the command table (list) shown in FIG. 9 (steps S1 and S3).

When the card is activated by a noncontacting interface 400 and the pattern in the predetermined area of the RAM 409 is (1,0), the CPU 405 looks up the command table (list) shown in FIG. 10 (steps S2 and S4).

If either command table (list) contains data corresponding to the received command, the CPU 405 executes a subroutine program in the ROM 406 (steps S5 and S6).

More specifically, when the card is activated by the contacting interface 401, commands AAA (additional write), BBB (read), CCC (rewrite), DDD (erase), and EEE (addition and change of system data) can be executed. When the card is activated by the noncontacting interface 400, only the commands AAA (additional write) and BBB (read) are executable. If this is the case, the external apparatus can execute only additional write and read to the user area of the EEPROM 407.

Accordingly, when this radio combination card 300 is inserted into a terminal apparatus and activated by the contacting interface 401, it is possible to update (add) data such as prepaid balance and erase unnecessary data.

On the other hand, when the card 300 is activated by the noncontacting interface 400, i.e., when the card 300 is used in a radio automatic ticket gate, bus fare adjusting machine, or automatic vending machine, it is possible to read out the balance or additionally write the used amount of money as history data, but any other command is inexecutable.

As described above, switching is performed between commands executable in contacting and noncontacting responses to an external apparatus. When used in a noncontacting response, the card is usable in various applications, e.g., not only as a collating medium for simply outputting data but also as a prepaid card.

In the above explanation, different command lists are set for contacting and noncontacting responses. However, a single command table (list) as shown in FIG. 11 can also be used for both contacting and noncontacting responses.

That is, as shown in FIG. 11, the feasibility of each command in a contacting response and the feasibility of each command in a noncontacting response are held as pieces of flag information in the table. When the card is activated by the contacting interface 401 and the pattern in the predetermined area of the RAM 409 is (0,1), the CPU 405 looks up the feasibility flag of the command in a contacting response.

When the card is activated by the noncontacting interface 400 and the pattern in the predetermined area of the RAM 409 is (1,0), the CPU 405 looks up the feasibility flag of the command in a noncontacting response and checks the feasibility of the command.

That is, the command is executable when the feasibility flag is "1" and inexecutable when the flag is "0".

In the fifth embodiment of the present invention as described above, switching is performed between commands executable in contacting and noncontacting responses to an external apparatus. When used in a noncontacting response, therefore, the card is usable in various applications, e.g., not only as a collating medium for simply outputting data but also as a prepaid card.

Additionally, the fifth embodiment of the present invention described above includes an inhibiting means for inhibiting the operation of the noncontacting interface 400 while the card is driven via the contacting interface 401. Hence, no operation error occurs even if electric waves are radiated in the environment while information is exchanged via the contacting interface 401.

Also, the above fifth embodiment includes a means for cutting off the conduction between the noncontacting interface 400 and an antenna coil (parallel tuning circuit) 301. Accordingly, no operation error occurs even if electric waves are radiated in the environment while information is exchanged via the contacting interface 401.

Furthermore, in the above fifth embodiment, the noncontacting interface 400 of a microprocessor 310 includes a power generator 302 which operates in accordance with an output from the parallel tuning circuit 301, a clock generating circuit (clock generating means) 307, a demodulation circuit (demodulating means) 303, a modulation circuit (modulating means) 304, and a reset signal generating circuit 308. A switch 309 for switching on and off the conduction between the noncontacting interface 400 and the parallel tuning circuit 301 is also included. This switch 309 is turned off when a Vcc voltage is applied via the contacting interface 401. Therefore, even if electric waves are radiated in the environment while information is exchanged via the contacting interface 401, the noncontacting interface 400 does not operate at all, so no operation error takes place.

The fifth embodiment of the present invention as described above can be summarized as follows.

(1) A radio combination card having contacting and noncontacting interfaces and driven by the contacting or noncontacting interface comprises a determining means for determining whether the radio combination card is activated by the contacting or noncontacting interface, and a switching means for performing switching between commands executable in contacting and noncontacting responses to an external apparatus.

(2) A CPU monitors the states of input terminals A and B and checks whether the radio combination card 300 is activated by the contacting or noncontacting interface.

If the card 300 is activated by the contacting interface, the CPU looks up a command table (list) for a contacting response. If the card 300 is activated by the noncontacting interface, the CPU looks up a command table (list) for a noncontacting response. If either command table (list) contains data corresponding to the received command, the CPU executes a subroutine program in a ROM. If not, the CPU determines that the command is inexecutable.

The fifth embodiment of the present invention as has been described in detail above can provide a portable electronic device including a composite IC card having contacting and noncontacting interfaces, capable of being used for various purposes by executing equivalent functions when driven in both contacting and noncontacting manners and achieving a satisfactory security function, and also capable of well maintaining the reliability as a composite IC card by preventing operation errors when driven from either interface.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A portable electronic device which has contacting and noncontacting interfaces and a control circuit connected to said contacting and noncontacting interfaces, and is driven by said contacting or noncontacting interface, comprising:

detecting means for detecting whether said portable electronic device is driven by via said contacting or noncontacting interface;

switching means for switching commands executable by said portable electronic device on the basis of the detection result from said detecting means; and a table storing lists of commands executable when said detecting means detects that said portable electronic device is driven by said contacting interface and commands executable when said detecting means detects that said portable electronic device is driven by said noncontacting interface, wherein said switching means determines on the basis of the detection result from said detection means whether a command received from an external apparatus can be executed by looking up said table.

2. A device according to claim 1, wherein said switching means permits execution of data rewrite and erase commands if said detecting means detects that said portable electronic device is activated by said contacting interface, and inhibits execution of the data rewrite and erase commands if said detecting means detects that said portable electronic device is activated by said noncontacting interface.

3. A device according to claim 1, wherein said switching means permits execution of data erase commands if said detecting means detects that said portable electronic device is activated by said contacting interface, and inhibits execution of the data erase commands if said detecting means detects that said portable electronic device is activated by said noncontacting interface.

4. A device according to claim 1, wherein said switching means permits execution of data rewrite commands if said detecting means detects that said portable electronic device is activated by said contacting interface, and inhibits execution of the data rewrite commands if said detecting means detects that said portable electronic device is activated by said noncontacting interface.

* * * * *